(12) United States Patent
Bushnell

(10) Patent No.: US 11,134,141 B1
(45) Date of Patent: Sep. 28, 2021

(54) ELECTRONIC DEVICES HAVING SHARED COIL STRUCTURES

(71) Applicant: Apple Inc., Cupertino, CA (US)

(72) Inventor: Tyler S. Bushnell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/899,463

(22) Filed: Jun. 11, 2020

Related U.S. Application Data

(60) Provisional application No. 62/878,664, filed on Jul. 25, 2019.

(51) Int. Cl.
| | | |
|---|---|---|
| *H04B 5/00* | (2006.01) | |
| *H04M 1/02* | (2006.01) | |
| *G06F 3/01* | (2006.01) | |
| *H02J 50/12* | (2016.01) | |
| *H01Q 7/00* | (2006.01) | |
| *H04R 1/04* | (2006.01) | |
| *H01F 27/36* | (2006.01) | |

(52) U.S. Cl.
CPC ............ *H04M 1/026* (2013.01); *G06F 3/016* (2013.01); *H01F 27/36* (2013.01); *H01Q 7/00* (2013.01); *H02J 50/12* (2016.02); *H04B 5/0031* (2013.01); *H04B 5/0087* (2013.01); *H04R 1/04* (2013.01)

(58) Field of Classification Search
CPC ................................ H04M 1/026; H02J 50/12
See application file for complete search history.

(56) References Cited

U.S. PATENT DOCUMENTS

| | | | |
|---|---|---|---|
| 9,118,354 B2 | 8/2015 | Kole | |
| 9,276,439 B2 | 3/2016 | Taguchi | |
| 9,276,639 B2 * | 3/2016 | Terlizzi | H02J 50/20 |
| 9,398,901 B2 | 7/2016 | Tischendorf et al. | |
| 10,225,716 B2 | 3/2019 | Terlizzi | |
| 10,236,942 B2 | 3/2019 | Lee et al. | |
| 10,263,451 B2 | 4/2019 | Konanur et al. | |
| 10,305,313 B2 | 5/2019 | Kwon | |
| 10,437,359 B1 * | 10/2019 | Wang | G06F 1/1643 |
| 2008/0116847 A1 | 5/2008 | Loke et al. | |
| 2013/0044907 A1 | 2/2013 | Klinghult | |
| 2018/0145398 A1 | 5/2018 | Lilja et al. | |

OTHER PUBLICATIONS

U.S. Appl. No. 16/537,220, filed Aug. 9, 2019.

* cited by examiner

*Primary Examiner* — Tuan H Nguyen
(74) *Attorney, Agent, or Firm* — Treyz Law Group, P.C.; Tianyi He

(57) ABSTRACT

An electronic device may have a housing, a battery, a conductive coil, near-field communications circuitry, amplifier circuitry, and wireless charging circuitry. The housing may have a housing wall. The conductive coil may be adhered to the housing wall. The conductive coil may be coiled around a magnet. The amplifier circuitry may drive audio signals and/or haptic signals onto the conductive coil that cause the conductive coil to vibrate the housing wall. The near-field communications circuitry may convey near-field communications signals through the housing wall using the conductive coil. The wireless charging circuitry may receive wireless power for charging the battery through the housing wall using the conductive coil. If desired, the conductive coil may include a first set of windings that lie within a surface extending along the housing wall and/or a second set of vertically-stacked windings that extend away from the housing wall.

19 Claims, 12 Drawing Sheets

120

| OPERATING STATE | ACOUSTIC OUTPUT | HAPTIC OUTPUT | NFC COMMS | WIRELESS CHARGING |
|---|---|---|---|---|
| A | INACTIVE | INACTIVE | INACTIVE | INACTIVE |
| B | ACTIVE | INACTIVE | INACTIVE | INACTIVE |
| C | INACTIVE | ACTIVE | INACTIVE | INACTIVE |
| D | INACTIVE | INACTIVE | ACTIVE | INACTIVE |
| E | INACTIVE | INACTIVE | INACTIVE | ACTIVE |
| F | ACTIVE | ACTIVE | INACTIVE | INACTIVE |
| G | INACTIVE | ACTIVE | ACTIVE | INACTIVE |
| H | INACTIVE | INACTIVE | ACTIVE | ACTIVE |
| I | ACTIVE | INACTIVE | ACTIVE | INACTIVE |
| J | INACTIVE | ACTIVE | INACTIVE | ACTIVE |
| K | ACTIVE | INACTIVE | INACTIVE | ACTIVE |
| L | ACTIVE | ACTIVE | ACTIVE | INACTIVE |
| M | INACTIVE | ACTIVE | ACTIVE | ACTIVE |
| N | ACTIVE | ACTIVE | INACTIVE | ACTIVE |
| O | ACTIVE | INACTIVE | ACTIVE | ACTIVE |
| P | ACTIVE | ACTIVE | ACTIVE | ACTIVE |

| OPERATING STATE | FIRST SOURCE | SECOND SOURCE | THIRD CHOICE |
|---|---|---|---|
| Q | INACTIVE | INACTIVE | INACTIVE |
| R | ACTIVE | INACTIVE | INACTIVE |
| S | INACTIVE | ACTIVE | INACTIVE |
| T | INACTIVE | INACTIVE | ACTIVE |
| U | ACTIVE | ACTIVE | INACTIVE |
| V | INACTIVE | ACTIVE | ACTIVE |
| W | ACTIVE | INACTIVE | ACTIVE |
| X | ACTIVE | ACTIVE | ACTIVE |

| OPERATING STATE | FIRST SOURCE | SECOND SOURCE |
|---|---|---|
| AA | INACTIVE | INACTIVE |
| BB | ACTIVE | INACTIVE |
| CC | INACTIVE | ACTIVE |
| DD | ACTIVE | ACTIVE |

*FIG. 12*

ELECTRONIC DEVICES HAVING SHARED COIL STRUCTURES

This application claims the benefit of provisional application No. 62/878,664, filed Jul. 25, 2019, which is hereby incorporated by reference herein in its entirety.

FIELD

This relates generally to electronic devices and, more particularly, to electronic devices with conductive coil structures.

BACKGROUND

Electronic devices such as tablet computers, cellular telephones, telephones, computers, watches, and other devices contain conductive coil structures that perform different functions. For example, conductive coil structures are often used to form a voice coil for an acoustic speaker, to form an inductive coil for performing wireless charging, or to form an inductive antenna for performing near-field communications.

In practice, conductive coil structures such as these can be bulky and can consume an excessive amount of space within an electronic device. At the same time, electronic devices with small sizes have become increasingly popular.

To ensure that an electronic device has a compact size, it may be desirable to eliminate unnecessary components. Minimizing device size in this way can be challenging, particularly when conductive coil structures are required for performing multiple different functions for the electronic device.

SUMMARY

An electronic device may have a housing, a battery, a conductive coil, near-field communications circuitry, amplifier circuitry, and wireless charging circuitry. Switching circuitry may couple the near-field communications circuitry, the amplifier circuitry, and the wireless charging circuitry to the conductive coil. Control circuitry may control the switching circuitry to activate one or more of the near-field communications circuitry, amplifier circuitry, and wireless charging circuitry at any given time.

The housing may have a housing wall. The conductive coil may be adhered to the housing wall. The conductive coil may be coiled around a magnet. The amplifier circuitry may drive audio signals and/or haptic signals onto the conductive coil that cause the conductive coil to vibrate the housing wall. The near-field communications circuitry may convey near-field communications signals through the housing wall using the conductive coil. The wireless charging circuitry may receive wireless power for charging the battery through the housing wall using the conductive coil. If desired, the conductive coil may include a first set of windings that lie within a surface extending along the housing wall and/or a second set of vertically-stacked windings that extend away from the housing wall. The conductive coil may include a third set of vertically-stacked windings that fill a cavity between the second set of windings and other components in the device.

If desired, the device may include at least first and second conductive coils that are adhered to the housing wall. The first conductive coil may, for example, be coiled around the magnet and may extend away from the housing wall. The second conductive coil may be coiled around the first conductive coil and may lie within a surface that runs along the housing wall. The amplifier circuitry may drive the audio signals and/or the haptic signals onto the first conductive coil to vibrate the housing wall. The near-field communications circuitry may convey near-field communications signals through the housing wall using the second conductive coil. The wireless charging circuitry may receive wireless power using the first and/or second conductive coils. One or more of the near-field communications circuitry, wireless charging circuitry, and amplifier circuitry may be omitted if desired.

BRIEF DESCRIPTION OF THE DRAWINGS

FIGS. 10-12 are tables of illustrative operating states for an electronic device of the type shown in FIGS. 1-9 in accordance with some embodiments.

DETAILED DESCRIPTION

Electronic devices and other items may be provided with a housing and one or more conductive coils. The housing may include a housing wall. The conductive coil may be attached to the housing wall using a layer of adhesive. The conductive coil may be coiled around a magnet. The magnet may be mounted to a logic board or other structures within the electronic device.

The electronic device may include acoustic/haptic amplifier circuitry, near-field communications circuitry, and/or wireless charging circuitry that each use the coil to transmit and/or receive information. For example, the amplifier circuitry may drive audio signals onto the coil that cause the coil to vibrate the housing wall to produce an audible sound. The amplifier circuitry may also drive haptic signals onto the coil that cause the coil to vibrate the housing wall to produce a haptic vibration alert. The near-field communications circuitry may convey radio-frequency near-field communications signals through the housing wall using the coil. The wireless charging circuitry may receive wireless charging signals through the housing wall using the coil. The wireless charging circuitry may charge a battery in the device using the received wireless charging signals. Switching circuitry may be used to activate the acoustic/haptic amplifier circuitry, the near-field communications circuitry, and the wireless charging circuitry at different times or to concurrently activate two or more of these components at once. Sharing the conductive coil in this way may serve to minimize space consumption within the device.

If desired, the conductive coil may include a set of flattened windings that lie within a surface that runs along the housing wall and/or a set of vertically-stacked windings that extend from the housing wall towards the logic board. In some scenarios, device components on the logic board may be separated from the set of vertically-stacked windings by a cavity. If desired, the conductive coil may include an additional set of vertically-stacked windings that fill the cavity. The set of flattened windings may serve to optimize near-field communications antenna efficiency for the coil. The set(s) of vertically-stacked windings may serve to optimize wireless charging efficiency for the device. If desired, two or more coils may be provided in the electronic device. The near-field communications circuitry, amplifier circuitry, and wireless charging circuitry may share one or more of the coils and/or may use one or more of the coils as dedicated coils for transmitting and/or receiving information.

Figure 1:
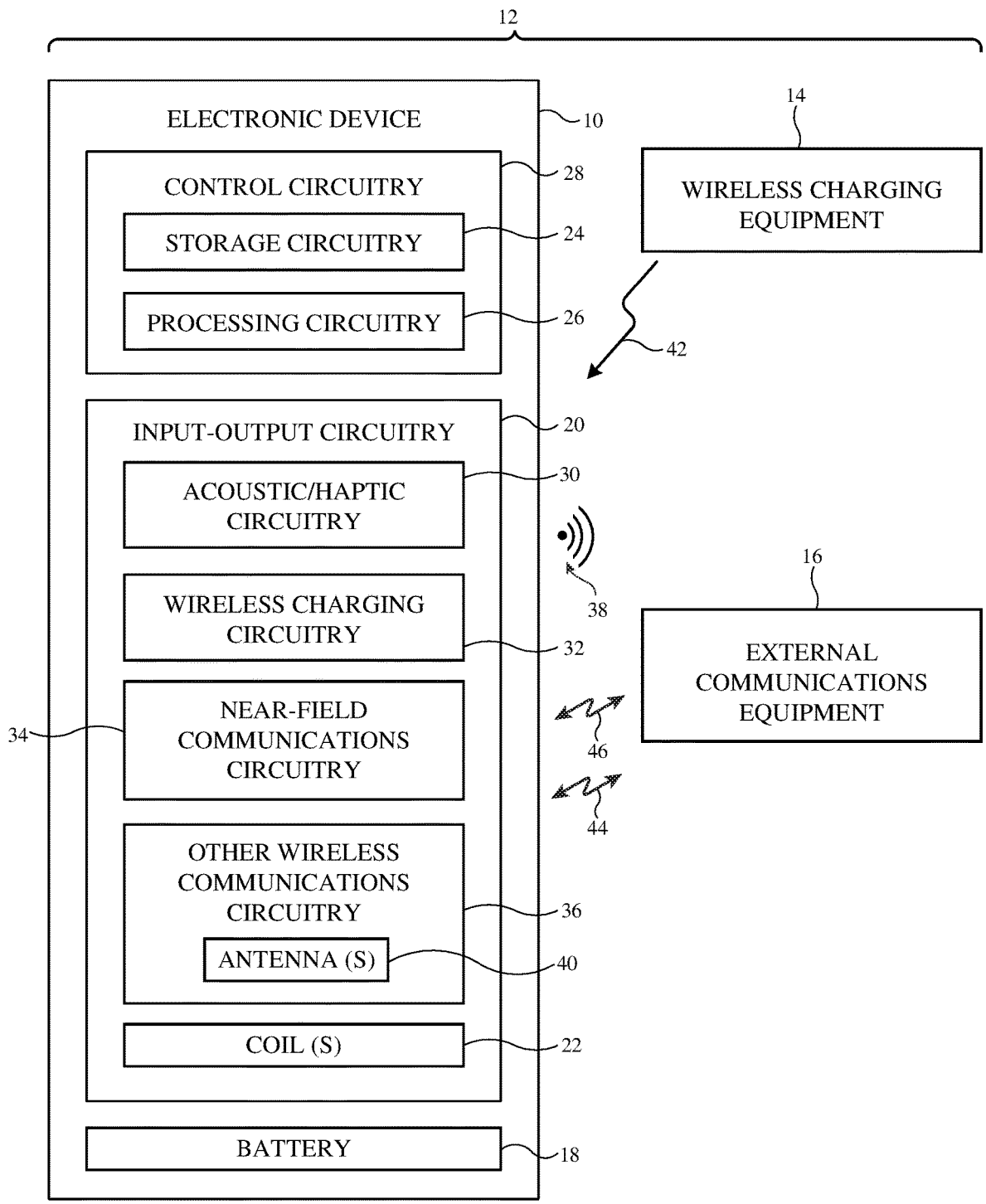
FIG. 1 is a schematic diagram of an illustrative electronic device that may be provided with shared coil structures in accordance with some embodiments.

An illustrative electronic device that may be provided with shared conductive coil structures is shown in FIG. 1. Electronic device 10 of FIG. 1 may be a portable electronic device or other suitable electronic device. For example, electronic device 10 may be a laptop computer, a tablet computer, a somewhat smaller device such as a wrist-watch device, pendant device, headphone device, earpiece device, wireless tag device, wireless tracking device (e.g., a tracking tag), or other miniature or wearable device, a larger handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may interact with other electronic devices or other electronic equipment in a system such as system 12 of FIG. 1. For example, device 10 may receive wireless power from wireless charging equipment 14 in the form of wireless charging signals 42 (e.g., radio-frequency signals transmitted over-the-air to charge device 10). Device 10 may also convey radio-frequency signals such as radio-frequency signals 46 and/or 44 with external communications equipment 16.

Wireless charging equipment 14 may be an electronic device such as a wireless charging mat that has a charging surface (e.g., a planar charging surface) that receives portable devices to be charged (e.g., device 10), a tablet computer or other portable electronic device with wireless power transmitting circuitry (e.g., one of devices 10 that has wireless power transmitting circuitry), or other wireless power transmitting device. External communications equipment 16 may be a laptop computer, a tablet computer, a somewhat smaller device such as a wrist-watch device, pendant device, headphone device, earpiece device, wireless tag device, wireless tracking device (e.g., a tracking tag), or other miniature or wearable device, a larger handheld device such as a cellular telephone, a media player, or other small portable device. External communications equipment 16 may also be a set-top box, a desktop computer, a display into which a computer or other processing circuitry has been integrated, a display without an integrated computer, a wireless access point, a wireless base station, an electronic device incorporated into a kiosk, building, or vehicle, a near field communications point of sale terminal for handling wireless payments, a near field communications reader associated with security equipment (e.g., a door opener, a badge reader, etc.), other near field communications equipment, or other suitable electronic equipment. Wireless charging equipment 14 and/or external communications equipment 16 may be omitted from system 12 if desired.

Device 10 may include control circuitry 28. Control circuitry 28 may include storage such as storage circuitry 24 and processing circuitry such as processing circuitry 26. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc. Processing circuitry 26 may be used to control the operation of device 10. Processing circuitry 26 may include one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, near-field communications (NFC) protocols, etc. Control circuitry 28 may also be used in implementing wireless charging protocols. Each communications protocol may be associated with a corresponding radio access technology (RAT) that specifies the physical connection methodology used in implementing the protocol.

Device 10 may include input-output circuitry 20. Input-output circuitry 20 may be used to allow data to be supplied to device 10 and to allow data to be provided from device 10 to external devices (e.g., wireless charging equipment 14 and/or external communications equipment 16). As shown in FIG. 1, input-output circuitry 20 may include acoustic/haptic circuitry 30, wireless charging circuitry 32, near-field communications circuitry 34, other wireless communications circuitry 36, and one or more conductive coils 22. This example is merely illustrative and, if desired, one or more of acoustic/haptic circuitry 30, wireless charging circuitry 32, near-field communications circuitry 34, and other wireless communications circuitry 36 may be omitted.

Coils 22 may be inductive coils that are used by one or more of acoustic/haptic circuitry 30, wireless charging circuitry 32, and near-field communications circuitry 34 to transmit and/or receive information (e.g., using radio-frequency signals, audible sound, and/or haptic vibrations). In practice, inductors such as coils 22 consume space within electronic device 10. To minimize the amount of space consumed by coils 22, device 10 can use shared and/or co-located coil configurations. For example, one or more coils 22 in device 10 may be shared between acoustic/haptic circuitry 30, wireless charging circuitry 32, and/or near-field communications circuitry 34. By using the coil(s) for multiple purposes (e.g., to transmit and/or receive information using two or more of acoustic/haptic circuitry 30, wireless charging circuitry 32, and/or near-field communications circuitry 34), duplication of resources and the size of device 10 can be minimized. Coils 22 may therefore sometimes be referred to herein as shared coils 22 or shared coil structures 22.

Acoustic/haptic circuitry 30 may include driver circuitry such as one or more amplifiers. The output of the driver circuitry (amplifiers) may be coupled to one or more coils 22. The driver circuitry may drive audio signals and/or haptic (vibrate) signals onto coil(s) 22. Control circuitry 28 may control acoustic/haptic circuitry 30 to produce the audio and haptic signals that are driven onto coil(s) 22. When driven with audio signals, coil(s) 22 may cause a diaphragm to move, thereby producing audible sound 38. Similarly, when driven with haptic signals, coil(s) 22 may cause the diaphragm to move, thereby producing physical (mechanical) vibrations that may be felt by a user of device 10 and/or external communications equipment 16. In this way, coil(s) 22 may function as an audio speaker and/or a haptic output device (e.g., a vibrator) that is controlled by acoustic/haptic circuitry 30 (e.g., coils 22 may include a type of coil that is sometimes referred to as a voice coil).

Near-field communications circuitry 34 may use one or more coils 22 to transmit and/or receive near-field communications signals to support communications between device 10 and external communications equipment 16 (e.g., a near-field communications reader or other external near-field communications equipment). Near-field communications may involve inductively coupled near field communications in which both the transmitter and receiver have associated inductors (e.g., coils such as coils 22) that are electromagnetically coupled (as shown schematically by radio-frequency signals 44 of FIG. 2). Radio-frequency signals 44 may therefore sometimes be referred to herein as near-field communications signals 44.

Near-field communications links typically are formed over distances of 20 cm or less (e.g., device 10 must be placed in the vicinity of the near-field communications reader for effective communications). With one suitable arrangement, near-field communications can be supported using signals at a frequency of 13.56 MHz or other frequencies below 600 MHz. Near-field communications circuitry 34 may include near-field communications transceiver circuitry that transmits and/or receives near-field communications signals 44 (e.g., near-field communications circuitry 34 may perform bidirectional communications in which data is both transmitted and received by near-field communications circuitry 34 using coils 22), near-field communications matching circuitry (e.g., impedance matching circuitry that matches the impedance of the near-field communications transceiver circuitry to the impedance of coil(s) 22 at the frequency of near-field communications signals 44), balun circuitry (e.g., circuitry that converts between differential and single-ended signals), and/or any other desired circuitry for supporting the transmission and reception of near-field communications signals 44.

Wireless charging equipment 14 may receive power from sources such as an AC power source, a battery, etc. Power supply circuitry on wireless charging equipment 14 may convert the AC power to DC power for powering the circuitry of wireless charging equipment 14. During operation, wireless charging equipment 14 may use radio-frequency circuitry to generate wireless power such as wireless charging signals 42 that are wirelessly transmitted to device 10 using inductor circuitry such as one or more wireless power transmitting coils on wireless equipment 14. Wireless charging circuitry 32 on device 10 can receive the transmitted wireless charging signals 42 using inductor circuitry such as coil(s) 22 and can convert these received signals into power for device 10. For example, system 12 may use resonant inductive coupling (near field electromagnetic coupling) between coil(s) 22 and a corresponding wireless power transmitting coil in wireless charging equipment 14 to transfer power from wireless charging equipment 14 to device 10. An illustrative frequency for wireless charging signals 42 is 200 kHz. Other frequencies may be used, if desired (e.g., frequencies in the kHz range, the MHz range, or in the GHz range, frequencies of 1 kHz to 1 MHz, frequencies of 1 kHz to 100 MHz, etc.).

As AC currents associated with wireless charging signals 42 pass through one or more wireless power transmitting coils on wireless charging equipment 14, a time varying electromagnetic (e.g., magnetic) field is produced that is received by one or more corresponding receiver coils such as coil(s) 22 in device 10. When the time varying electromagnetic field is received by coil(s) 22, corresponding alternating-current currents are induced in the coil(s). Wireless charging circuitry 32 may include converter circuitry such as rectifier circuitry. The rectifier circuitry may include rectifying components such as synchronous rectification metal-oxide-semiconductor transistors arranged in a bridge network, and may convert received AC signals (received alternating-current signals associated with wireless charging signals 42) from coil(s) 22 into DC voltage signals for powering device 10.

The DC voltages produced by the rectifier circuitry in wireless charging circuitry 32 can be used in powering (charging) an energy storage device such as battery 18 and can be used in powering other components in device 10 (e.g., acoustic/haptic circuitry 30, near-field communications circuitry 34, other wireless communications circuitry 36, control circuitry 28, etc.). In this example, battery 18 is rechargeable using wireless charging signals 42. In another suitable arrangement, battery 18 may be a removable battery that can be removed and replaced by a user upon depletion of charge. Wireless charging circuitry 32 may be omitted in this scenario.

Other wireless communications circuitry 36 may include transceiver circuitry for supporting radio-frequency non-near-field communications with external communications equipment 16 (e.g., using radio-frequency signals such as radio-frequency signals 46 that operate in the far field domain). For example, other wireless communications circuitry 36 may include ultra-wideband (UWB) transceiver circuitry that supports communications using the IEEE 802.15.4 protocol and/or other ultra-wideband communications protocols. Ultra-wideband radio-frequency signals may be based on an impulse radio signaling scheme that uses band-limited data pulses. Ultra-wideband signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices (e.g., device 10 and external communications equipment 16) may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). Ultra-wideband transceiver circuitry may operate (convey radio-frequency signals) in communications bands such as one or more ultra-wideband communications bands between about 5 GHz and about 8.3 GHz (e.g., a 6.5 GHz UWB communications band, an 8 GHz UWB communications band, and/or bands at other suitable frequencies).

If desired, other wireless communications circuitry 36 may also include non-UWB transceiver circuitry. The non-UWB transceiver circuitry may handle communications bands other than UWB communications bands such as 2.4 GHz and 5 GHz bands for Wi-Fi® (IEEE 802.11) communications or communications in other wireless local area network (WLAN) bands, the 2.4 GHz Bluetooth® communications band or other wireless personal area network (WPAN) bands, and/or cellular telephone frequency bands such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies (as examples). Other wireless communications circuitry 36 may include 60 GHz transceiver circuitry (e.g., millimeter wave transceiver circuitry), circuitry for receiving television and radio signals, paging system transceivers, optical transceiver circuitry, etc.

Other wireless communications circuitry 36 may transmit and/or receive radio-frequency signals 46 using one or more antennas 40. Antennas 40 may be separate from coil(s) 22 and may radiate radio-frequency signals in the far field domain. Antennas 40 may be formed using any suitable types of antenna structures. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of two or more of these designs, etc.

The example of FIG. 1 is merely illustrative. Device 10 may convey radio-frequency signals 46 and near-field communications signals 44 with the same external communications equipment 16 or may convey signals 44 and 46 to different external communications devices. If desired, input-output circuitry 20 may include other input-output devices (not shown in FIG. 1 for the sake of clarity) such as user interface devices, data port devices, touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors, etc. In one suitable arrangement that is sometimes described herein as an example, device 10 may be formed without any display (e.g., without an LCD display, touch screen display, any other type of display having display pixel circuitry, etc.) to minimize the manufacturing cost and complexity for device 10. This may also allow device 10 to exhibit a relatively small size while consuming relatively little power (e.g., device 10 may be only a few centimeters or less in diameter).

Control circuitry 28 may control acoustic/haptic circuitry 30 to transmit audio and/or haptic signals over coil(s) 22, may control wireless charging circuitry 32 to receive wireless charging signals 42 over coil(s) 22 and to charge battery 18 using the received wireless charging signals, and may control near-field communications circuitry 34 to transmit and/or receive near-field communications signals 44 using coil(s) 22. As one example, control circuitry 28 may control acoustic/haptic circuitry 30 to drive coil(s) 22 to issue an audible alert and/or a vibration alert upon receipt of a control signal from external communications equipment 16 (e.g., as conveyed over near-field communications signals 44 or radio-frequency signals 46) or upon detection of any other desired trigger condition at control circuitry 28 (e.g., based on software running on device 10). In this arrangement, the audio and/or vibration alert may help a user of external communications equipment 16 to locate device 10. If desired, control circuitry 28 may control acoustic/haptic circuitry 30 to drive coil(s) 22 to convey any desired information to a user of device 10 and/or external communications equipment 16.

As another example, control circuitry 28 may control wireless charging circuitry 32 to charge battery 18 using wireless charging signals 42 received by coil(s) 22 upon detection of wireless charging signals 42 (e.g., control circuitry 28 may include power monitoring circuitry that monitors coil(s) 22 for the receipt of wireless charging signals 42), upon receipt of a control signal from external communications equipment 16 to begin wireless charging (e.g., as conveyed over near-field communications signals 44 or radio-frequency signals 46), periodically, and/or upon detection of any other desired trigger condition. Similarly, control circuitry 28 may control near-field communications circuitry 34 to transmit or receive data using coil(s) 22 upon receipt of near-field communications signals 44 (e.g., when a user swipes device 10 over external communications equipment 16 or when a user swipes external communications equipment 16 over device 10), upon detection of wireless charging signals 42, upon receipt of a control signal from external communications equipment 16 (e.g., as conveyed over near-field communications signals 44 or radio-frequency signals 46), periodically, and/or upon detection of any other desired trigger condition. Data conveyed using near-field communications signals 44 may, for example, be used to pair device 10 to external communications equipment 16 for subsequent communications using radio-frequency signals 46, to identify device 10 to a user of external communications equipment 16 (e.g., so that the user can determine the identity of device 10 upon swiping external communications equipment 16 over device 10, etc.), or for performing any other desired operations for system 12.

Figure 2:
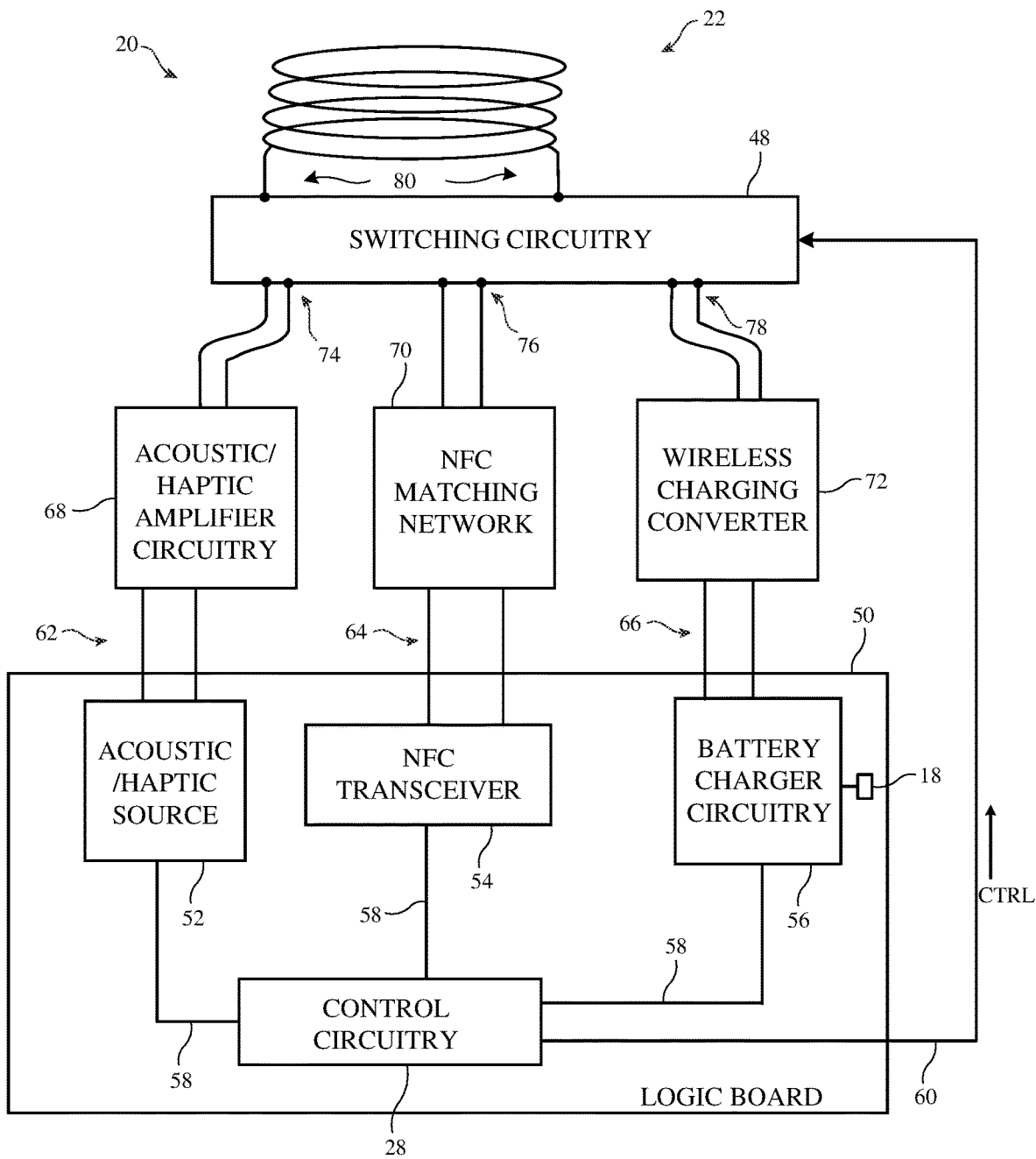
FIG. 2 is a schematic diagram of illustrative input-output circuitry that includes a conductive coil shared by acoustic and haptic amplifier circuitry, near-field communications circuitry, and wireless charging circuitry in accordance with some embodiments.

Control circuitry 28 may selectively activate (enable) one or more of acoustic/haptic circuitry 30, wireless charging circuitry 32, and near-field communications circuitry 34 to transmit and/or receive wireless signals using coil(s) 22 at any given time. FIG. 2 is a schematic diagram showing how control circuitry 28 may selectively activate one or more of these components for use with a single coil 22.

As shown in FIG. 2, input-output circuitry 20 may include a logic board such as logic board 50. Logic board 50 may be a printed circuit board (e.g., a rigid printed circuit board or flexible printed circuit), an integrated circuit package, or any other desired substrate. Control circuitry 28, near-field communications (NFC) transceiver circuitry 54 (sometimes referred to herein as an NFC transceiver), acoustic/haptic source circuitry 52, and battery charger circuitry 56 may be mounted to logic board 50. This is merely illustrative and, if desired, two or more of these components may be mounted to separate logic boards or substrates.

Acoustic/haptic source circuitry 52 may be coupled to acoustic/haptic amplifier (driver) circuitry 68 over path 62. Acoustic/haptic source circuitry 52 and acoustic/haptic amplifier circuitry 68 may form part of acoustic/haptic circuitry 30 of FIG. 1. NFC transceiver circuitry 54 may be coupled to NFC matching network (circuitry) 70 over path 64. NFC transceiver circuitry 54 and NFC matching network 70 may form part of near-field communications circuitry 34 of FIG. 1. Battery charger circuitry 56 may be coupled to wireless charging converter (circuitry) 72 over path 66. Battery charger circuitry 56 and wireless charging converter 72 may form part of wireless charging circuitry 32 of FIG. 1.

Input-output circuitry 20 may include switching circuitry 48. Switching circuitry 48, acoustic/haptic amplifier circuitry 68, NFC matching network 70, and/or wireless charging converter 72 may be mounted to logic board 50 or formed separately from logic board 50. Switching circuitry 48 may include any desired number of one or more switches arranged in any desired manner (e.g., switching circuitry 48 may include a network of switches, a switch matrix, etc.). Switching circuitry 48 may have a first port 74 coupled to acoustic/haptic amplifier circuitry 68, a second port 76 coupled to NFC matching network 70, and a third port 78 coupled to wireless charging converter 72. Switching circuitry 48 may also have a port that is coupled to the coil leads 80 of a corresponding coil 22. In the example of FIG. 2, input-output circuitry 20 includes a single coil 22. This is merely illustrative and, in general, any desired number of coils 22 may be coupled to switching circuitry 48.

Control circuitry 28 may be coupled to acoustic/haptic source circuitry 52, NFC transceiver circuitry 54, and battery charger circuitry 56 over control paths 58. Control circuitry 28 may be coupled to switching circuitry 48 over control path 60. Control circuitry 28 may convey control signals CTRL to switching circuitry 48 over control path 60 to control which of acoustic/haptic amplifier circuitry 68, NFC matching network 70, and wireless charging converter 72 is coupled to coil 22 and thus which of acoustic/haptic circuitry 30, wireless charging circuitry 32, or near-field communications circuitry 34 of FIG. 1 is active at any given time.

For example, control circuitry 28 may place switching circuitry 48 in a first state in which switching circuitry 48 only couples port 74 to coil 22 while ports 76 and 78 are decoupled from coil 22. In this state, acoustic/haptic circuitry 30 (FIG. 1) is active (enabled) whereas wireless charging circuitry 32 and near-field communications circuitry 34 are inactive (disabled). Control circuitry 28 may control acoustic/haptic source circuitry 52 to produce audio signals and/or haptic signals that are conveyed to amplifier circuitry 68 over path 62. Amplifier circuitry 68 may amplify the audio signals and/or haptic signals, which are then driven onto coil 22 through switching circuitry 48. When driven with the amplified audio signals, coil 22 may cause a diaphragm to move, producing audible sound 38 of FIG. 1. The audible sound may be, for example, between 200 and 20,000 Hz to accommodate the natural response of the human ear. When driven with the amplified haptic signals, coil 22 may cause the diaphragm to move at a different frequency and/or with a different intensity or magnitude (e.g., with a different wave pattern), producing a physical vibration that can be felt by a user. In one suitable arrangement, amplifier circuitry 68 may provide greater gain when the haptic signals are driven onto coil 22 than when the audio signals are driven onto coil 22. If desired, amplifier circuitry 68 may concurrently drive coil 22 using both audio signals and haptic signals.

The example of FIG. 2 is merely illustrative. In another suitable arrangement, input-output circuitry 20 may include separate haptic amplifier and acoustic amplifier circuitry. In this scenario, control circuitry 28 may control switching circuitry 48 to couple the haptic amplifier circuitry to coil 22 when coil 22 is being used to produce a physical vibration and may control switching circuitry 48 to couple the audio amplifier circuitry to coil 22 when coil 22 is being used to produce an audible sound.

In another example, control circuitry 28 may place switching circuitry 48 in a second state in which switching circuitry 48 only couples port 76 to coil 22 while ports 74 and 78 are decoupled from coil 22. In this state, near-field communications circuitry 34 (FIG. 1) is active (enabled). Control circuitry 28 may control NFC transceiver circuitry 54 to transmit radio-frequency signals to coil 22 through path 64, NFC matching network 70, and switching circuitry 48. Coil 22 may wirelessly transmit the radio-frequency signals (e.g., as near-field communications signals 44 of FIG. 1). NFC matching network 70 may ensure that the impedance of path 64 is matched to the impedance of coil 22 (e.g., to maximize the efficiency of coil 22 for near-field transmission). Similarly, NFC transceiver circuitry 54 may receive radio-frequency signals (e.g., near-field communications signals 44 of FIG. 1) via coil 22, switching circuitry 48, and NFC matching network 70.

In yet another example, control circuitry 28 may place switching circuitry 48 in a third state in which switching circuitry 48 only couples port 78 to coil 22 while ports 74 and 76 are decoupled from coil 22. In this state, wireless charging circuitry 32 (FIG. 1) is active (enabled). Coil 22 may receive wireless charging signals 42 (FIG. 1). Wireless charging converter 72 may receive the wireless charging signals from coil 22 and may convert the wireless charging signals into a DC voltage. For example, wireless charging converter 72 may include rectifier circuitry that converts the AC wireless charging signals into the DC voltage. Battery charger circuitry 56 may use the converted signals (e.g., the DC voltage) to charge battery 18. In the example of FIG. 2, battery 18 is mounted to logic board 50. This is merely illustrative and, in general, battery 18 may be mounted elsewhere in device 10. If desired, battery charger circuitry 56 and/or wireless charging converter 72 may include bridge circuits, voltage dividers, buck converters, switched capacitor converters, and/or any other desired circuitry for controlling the charging of battery 18 using the wireless charging signals received by coil 22.

If desired, control circuitry 28 may control switching circuitry 48 to simultaneously couple two or three of ports 74, 76, and 78 to coil 22. This may allow acoustic/haptic amplifier circuitry 68 (e.g., acoustic/haptic circuitry 30 of FIG. 1), NFC matching network 70 (e.g., near-field communications circuitry 34 of FIG. 1), and/or wireless charging converter 72 (e.g., wireless charging circuitry 32 of FIG. 1) to be active at any given time. In this way, the same coil 22 may be shared by these components to sequentially and/or concurrently produce audible sound (e.g., sound 38 of FIG. 1), produce a haptic alert or vibration, transmit and/or receive wireless data using near-field communications signals, and/or receive wireless charging signals for charging battery 18.

Figure 3:
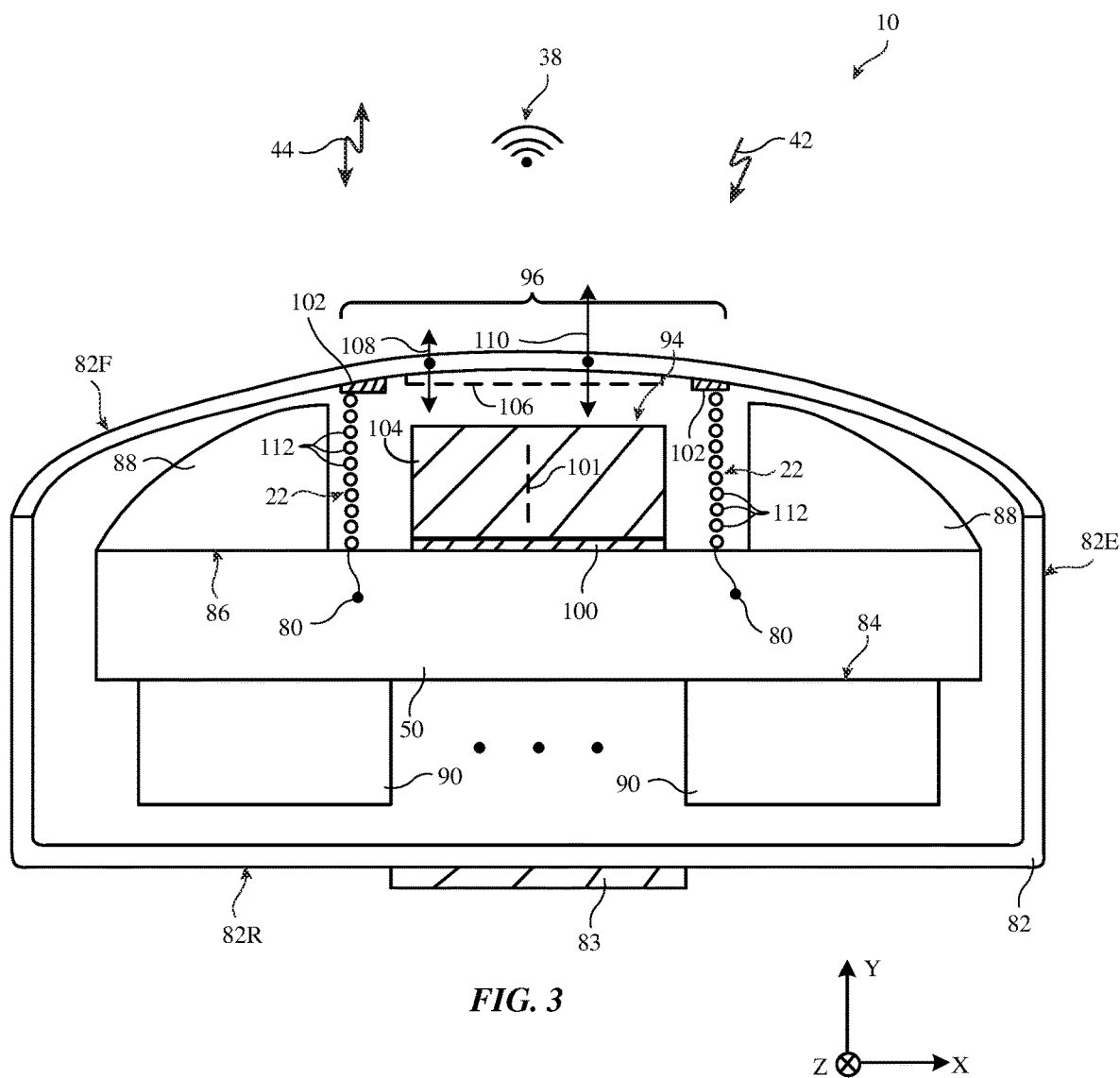
FIG. 3 is a cross-sectional side view of an illustrative electronic device having shared coil structures in accordance with some embodiments.

FIG. 3 is a cross-sectional side view showing how coil 22 may be mounted within device 10. As shown in FIG. 3 the components of device 10 may be enclosed within an electronic device housing such as housing 82. Housing 82, which may sometimes be referred to as a case, may be formed of plastic, glass, ceramics, fiber composites, metal (e.g., stainless steel, aluminum, etc.), other suitable materials, or a combination of these materials. In some situations, parts or all of housing 82 may be formed from dielectric or other low-conductivity material (e.g., glass, ceramic, plastic, sapphire, etc.). In other situations, housing 82 or at least some of the structures that make up housing 82 may be formed from metal elements.

In one suitable arrangement that is described herein as an example, housing 82 may have a substantially cylindrical shape in which sidewall 82E extends circumferentially around central axis 101 (e.g., sidewall 82E may be a continuously curved cylindrical sidewall or may have any other desired shape following any desired path). Sidewall 82E may extend from rear wall 82R to front wall 82F of housing 82. Sidewall 82E, rear wall 82R, and front wall 82F may be formed from a single integral piece of dielectric and/or metal material (e.g., in a unibody configuration) or may be formed from two or more pieces of dielectric and/or metal materials. In one suitable arrangement, rear wall 82R is flat (e.g., planar) whereas front wall 82F is curved (e.g., dome-shaped, hemispherical, etc.). This is merely illustrative and, in general, front wall 82F and rear wall 82R may have any desired planar or non-planar (e.g., free-form curved) shapes. Front wall 82F need not have the same shape as rear wall 82R. Front wall 82F and rear wall 82R may have lateral outlines (e.g., in the X-Y plane of FIG. 3) that are circular, elliptical, square, rectangular, combinations of these, or any other lateral shapes. Front wall 82F and rear wall 82R may each have a diameter (in the X-Y plane) of 0.5-5 cm, 1-6 cm, 1-3 cm, less than 8 cm, less than 5 cm, less than 4 cm, less than 3 cm, or less than 2 cm, as examples. Sidewall 82E may have a height (e.g., parallel to the Z-axis) of 0.1-1 cm, 0.2-0.8 cm, 0.5-2 cm, less than 2 cm, less than 1 cm, or less than 0.5 cm, as examples. Housing 82 need not be cylindrical and may, in general, have any desired shape.

If desired, attachment structures such as attachment structures 83 may be provided at or on rear wall 82R. Attachment structures 83 may include adhesive, one or more suction cups, screws, clips, pins, springs, magnets, or any other desired fastening structures. Attachment structures 83 may serve to hold housing 82 in place on an underlying surface or object (not shown in FIG. 3 for the sake of clarity). For example, attachment structures 83 may be used to attach (secure) housing 82 and thus device 10 to another electronic device (e.g., a laptop, tablet, keyboard, mouse, stylus, mobile phone, gaming device, television, headset, headphones, etc.), furniture, keys, other household objects, pets, clothing, etc. When secured to an underlying surface or object in this way, device 10 may help external equipment (e.g., external communications equipment 16 of FIG. 1) to identify the location of the underlying surface or object. This example is merely illustrative. Attachment structures 83 may be omitted or formed internally within housing 82 if desired.

As shown in FIG. 3, logic board 50 may be mounted within housing 82. Coil 22 may be mounted within housing 82 at a location between front wall 82F and upper surface 86 of logic board 50. Coil 22 may be secured to region 96 of front wall 82F using adhesive 102. Other components such as components 88 may be mounted to upper surface 86 of logic board 50. Other components such as components 90 may be mounted to lower surface 84 of logic board 50. Other components 88 and other components 90 may include portions of input-output circuitry 20 (FIG. 1), control circuitry 28, battery 18, and/or any other desired components within device 10.

Coil 22 may be located within a cavity or volume defined by other components 88 (e.g., coil 22 may conform to the shape of the surrounding components 88 and front housing wall 82F). Coil 22 may include windings 112 of metal wire (e.g., copper wire) or other conductive material that are circumferentially wrapped around central axis 101 and that terminate at coil leads 80. Coil leads 80 may be coupled to contact pads, conductive pins, or other conductive interconnect structures on logic board 50 (e.g., for coupling to switching circuitry 48 of FIG. 2). Windings 112 may be vertically stacked under front wall 82F (e.g., parallel to the Z axis of FIG. 3 so that the coil forms a solenoid). The windings 112 of coil 22 may have any desired lateral outline (in the X-Y plane) such as a circular lateral outline, an elliptical lateral outline, a square lateral outline, a rectangular lateral outline, a triangular lateral outline, a freeform lateral outline that conforms to the volume defined by other components 88, a polygonal lateral outline, combinations of these, etc.

The windings 112 of coil 22 may surround cavity 94. A stationary magnet such as magnet 104 may be mounted to upper surface 86 of logic board 50. For example, a layer of adhesive such as adhesive 100 may be used to attach (adhere) magnet 104 to upper surface 86 or other components in device 10. Magnet 104 may be a permanent magnet or any other desired magnet structure. When coil 22 is driven by audio signals using acoustic/haptic amplifier circuitry 68 of FIG. 2 (e.g., when acoustic/haptic circuitry 30 of FIG. 1 is actively using coil 22 to emit sound as a speaker), the audio signals produce a current that flows through windings 112 of coil 22. Magnet 104 magnetically interacts with the magnetic field produced by this current to cause coil 22 to mechanically move up and down. Because coil 22 is affixed to front wall 82F using adhesive 102, the motion of coil 22 also causes region 96 of front wall 82F to mechanically move up and down, as shown by arrow 108. This motion may produce audible sound 38 that is emitted by device 10 (e.g., region 96 of front wall 82F may form a speaker diaphragm for coil 22). In this way, coil 22 and front wall 82F may serve as an audio speaker for device 10 (e.g., where coil 22 is a voice coil and cavity 94 serves as an acoustic cavity for the speaker). If desired, the dimensions of cavity 94 may be selected to help tune the audio (frequency) response of sound 38.

When coil 22 is driven by haptic signals using acoustic/haptic amplifier circuitry 68 of FIG. 2 (e.g., when acoustic/haptic circuitry 30 of FIG. 1 is actively using coil 22 to vibrate to emit a vibration alert or other haptic information), the haptic signals produce a current that flows through windings 112 of coil 22. Magnet 104 magnetically interacts with the magnetic field produced by this current to cause coil 22 to mechanically move up and down. Because coil 22 is affixed to front wall 82F using adhesive 102, the motion of coil 22 also causes region 96 of front wall 82F to mechanically move up and down. The haptic signals may, for example, cause coil 22 to move with a greater magnitude and/or with a different frequency or waveform than the audio signals, thereby causing region 96 of front wall 82F to vibrate up and down, as shown by arrow 110. This vibration may, for example, be greater in magnitude than the motion produced by audio signals driven onto coil 22 (e.g., as shown by arrow 108). This motion may produce a haptic vibration that can be physically felt by a user.

If desired, front wall 82F may be formed from a first material outside of region 96 and from a second material that is denser than the first material within region 96. For example, the portion of front wall 82F outside of region 96 may be formed from plastic whereas region 96 of front wall 82F is formed from a denser plastic, metal, etc. This increased mass (density) may cause the haptic vibration of front wall 82F to feel more noticeable to a user. In another suitable arrangement, front wall 82F may be thicker within region 96 than outside of region 96 to increase the mass of region 96 for enhancing the noticeability of the haptic vibration. If desired, a layer of additional material such as optional layer 106 may be layered onto front wall 82F within region 96 to increase the mass of region 96 for enhancing the noticeability of the haptic vibration. Combinations of these arrangements may be used if desired.

As shown in FIG. 3, coil 22 may transmit and receive near-field communications signals 44 through front wall 82F (e.g., when near-field communications circuitry 34 of FIG. 1 is active). Coil 22 may also receive wireless charging signals 42 through front wall 82F (e.g., when wireless charging circuitry 32 of FIG. 1 is active). In this way, the same volume within device 10 may be utilized to produce sound 38, to produce haptic alerts or other vibrations, to transmit and/or receive near-field communications data, and to wirelessly charge battery 18. This may serve to optimize space consumption within device 10.

Figure 4:
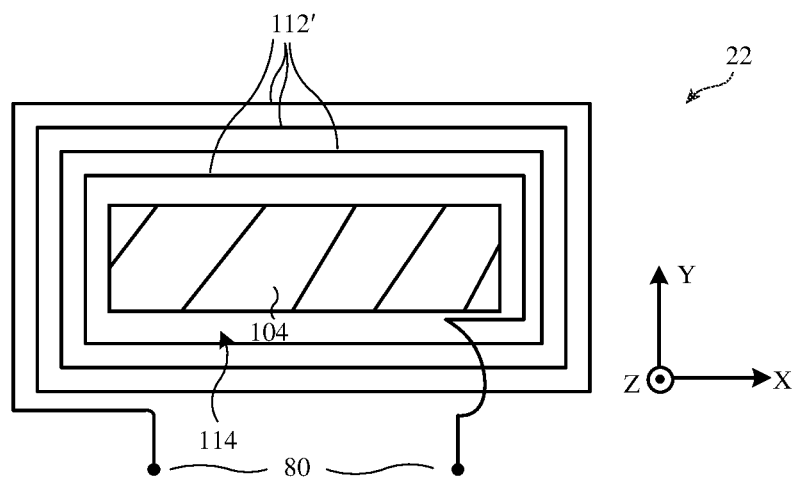
FIG. 4 is a top-down view of an illustrative coil that includes flattened windings to optimize near-field communications efficiency in accordance with some embodiments.

The example of FIG. 3 is merely illustrative. In general, coil 22 may have other desired shapes or arrangements. FIG. 4 is a top-down view of coil 22 in an example where the windings 112 of coil 22 are provided in a flattened arrangement. As shown in FIG. 4, coil 22 may include flattened windings 112 such as flattened windings 112' extending between coil leads 80. Flattened windings 112' may lie within a corresponding surface (e.g., a planar surface such as the X-Y surface of FIG. 4 or a curved surface that conforms to the shape of front wall 82F of FIG. 3). Flattened windings 112' may surround an opening 114 that is aligned with the underlying magnet 104. When arranged in this way, coil 22 may, for example, convey near-field communications signals 44 of FIG. 3 with optimized efficiency (e.g., with greater antenna efficiency than in scenarios where the windings of coil 22 are vertically stacked).

The example of FIG. 4 in which flattened windings 112' follow a rectangular path around opening 114 is merely illustrative. In general, flattened windings 112' may follow a path having any desired shape (e.g., a circular shape, an elliptical shape, a square shape, or any other desired shape having any desired number of straight and/or curved segments). If desired, coil 22 may have both flattened windings and vertically-stacked windings.

Figure 5:
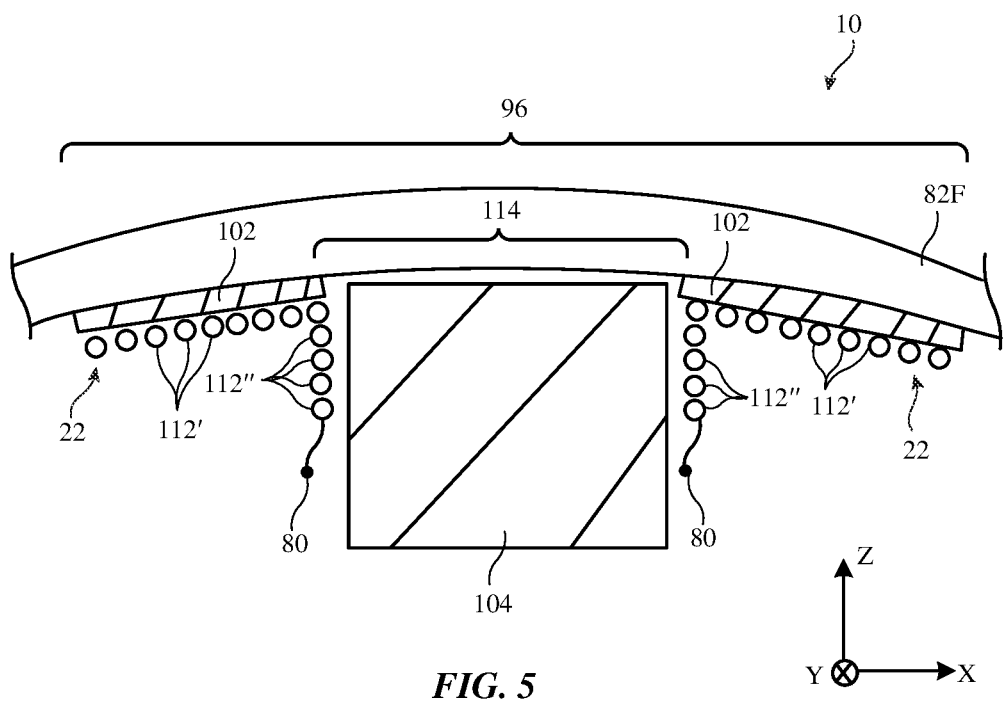
FIG. 5 is a cross-sectional side view of an illustrative coil that includes both flattened windings and vertically-stacked windings in accordance with some embodiments.

FIG. 5 is a cross-sectional side view showing how coil 22 may include both flattened windings and vertically-stacked windings. As shown in FIG. 5, coil 22 may include flattened windings 112' and vertically-stacked windings 112" extending between coil leads 80. In the example of FIG. 5, coil leads 80 are shown as being coupled to vertically-stacked windings 112". This is merely illustrative and, if desired, coil leads 80 may be coupled to flattened windings 112' or one coil lead may be coupled to flattened windings 112' while the other coil lead is coupled to vertically-stacked windings 112".

Flattened windings 112' may be attached to front wall 82F using adhesive 102. As shown in FIG. 5, flattened windings 112' may lie within a surface that conforms to (e.g., follows) the geometry of front wall 82F. Vertically-stacked windings 112" may be located between flattened windings 112' and magnet 104. This is merely illustrative and, if desired, flattened windings 112' may be interposed between vertically-stacked windings 112" and magnet 104. Flattened windings 112' may sometimes be referred to herein as a set of windings lying along a surface whereas vertically-stacked windings 112" are sometimes referred to herein as a set of windings that are vertically-stacked. When arranged in this way, coil 22 may, for example, convey near-field communications signals 44 of FIG. 3 with optimized efficiency while also exhibiting optimal audio and/or haptic response (e.g., coil 22 of FIG. 5 may exhibit greater antenna efficiency than in scenarios where coil 22 includes only vertically-stacked windings and may exhibit superior audio and/or haptic response quality than in scenarios where coil 22 includes only flattened windings 112'). Coil 22 of FIG. 5 may have other shapes. If desired, coil 22 may have multiple layers of vertically-stacked windings.

Figure 6:
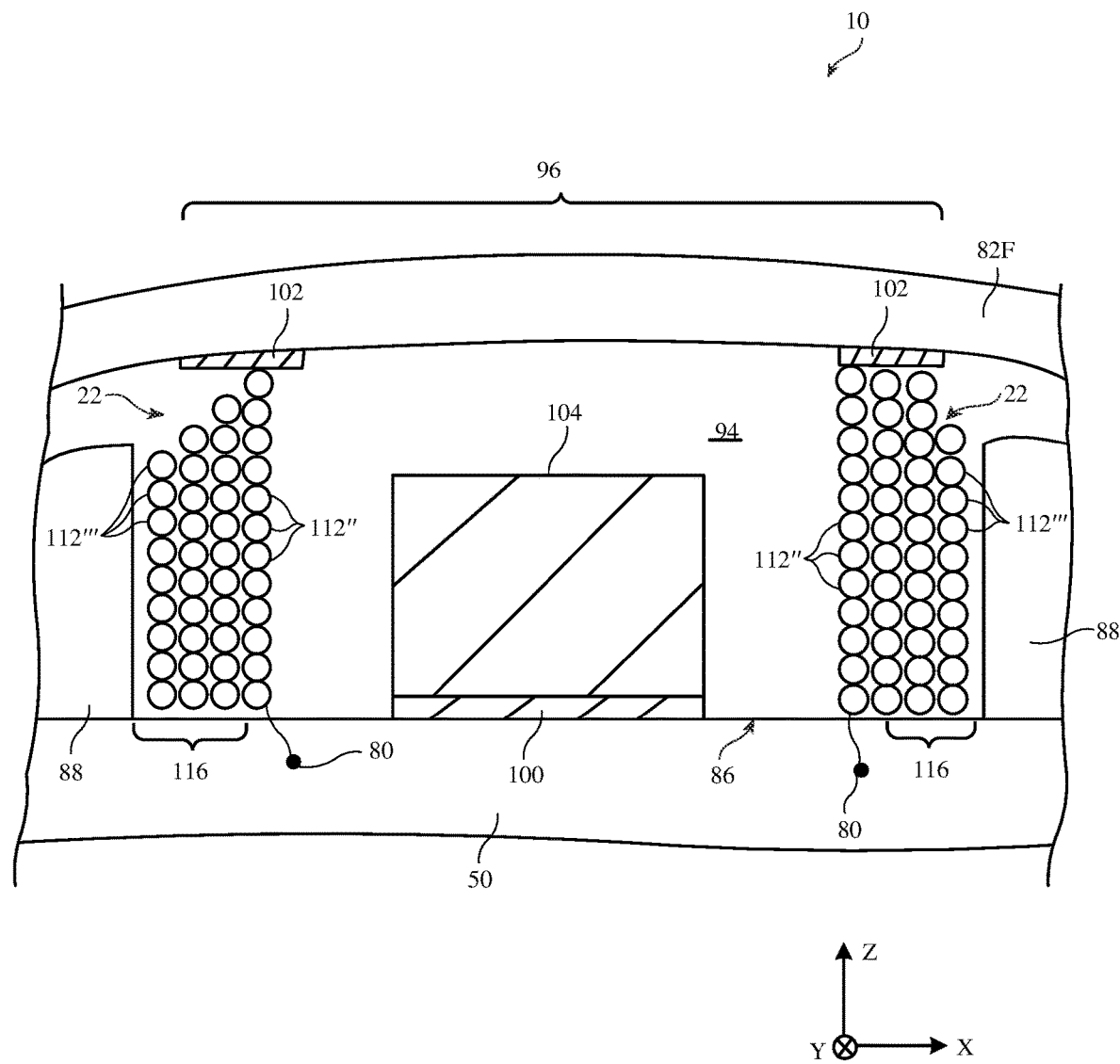
FIG. 6 is a cross-sectional side view of an illustrative coil that includes include multiple layers of vertically-stacked windings to optimize wireless charging efficiency in accordance with some embodiments.

FIG. 6 is a cross-sectional side view showing how coil 22 may include multiple layers of vertically-stacked windings. As shown in FIG. 5, coil 22 may include vertically-stacked windings 112". There may be a cavity such as cavity 116 (laterally) interposed between other electrical components 88 and vertically stacked windings 112". If desired, coil 22 may include additional layers (sets) of vertically-stacked windings 112''' located within cavity 116 between other components 88 and vertically-stacked windings 112" (e.g., the windings closest to magnet 104). The additional layers of vertically-stacked windings 112''' may be arranged in uniform rows and columns or in any other desired pattern. If desired, the additional layers of vertically-stacked windings 112''' may completely or almost completely fill cavity 116. The additional layers of vertically-stacked windings 112''' may be adhered to front wall 82F by adhesive 102 or adhesive 102 may only adhere vertically-stacked windings 112" to front wall 82F. In the example of FIG. 5, coil leads 80 are shown as being coupled to vertically-stacked windings 112". This is merely illustrative and, if desired, coil leads 80 may be coupled to the additional layers of vertically-stacked windings 112''' or one coil lead may be coupled to the additional layers of vertically-stacked windings 112''' while the other coil lead is coupled to vertically-stacked windings 112".

The additional layers of vertically-stacked windings 112''' may effectively increase the amount of conductive material (e.g., copper) within coil 22 and may thereby allow coil 22 to capture more electromagnetic flux passing through cavity 94 than in scenarios where only a single layer of vertically-stacked windings 112" is used. When arranged in this way, coil 22 may, for example, receive wireless charging signals 42 (FIG. 3) with optimized efficiency and may thereby charge battery 18 with optimized charging efficiency (e.g., device 10 of FIG. 6 may operate with greater charging efficiency than in scenarios where coil 22 includes only a single layer of vertically-stacked windings or where coil 22 includes only flattened windings). The example of FIG. 6 is merely illustrative. Coil 22 may have other shapes. If desired, the arrangements of FIGS. 3-6 may be combined (e.g., coil 22 may include flattened windings and multiple layers of vertically-stacked windings).

Figure 7:
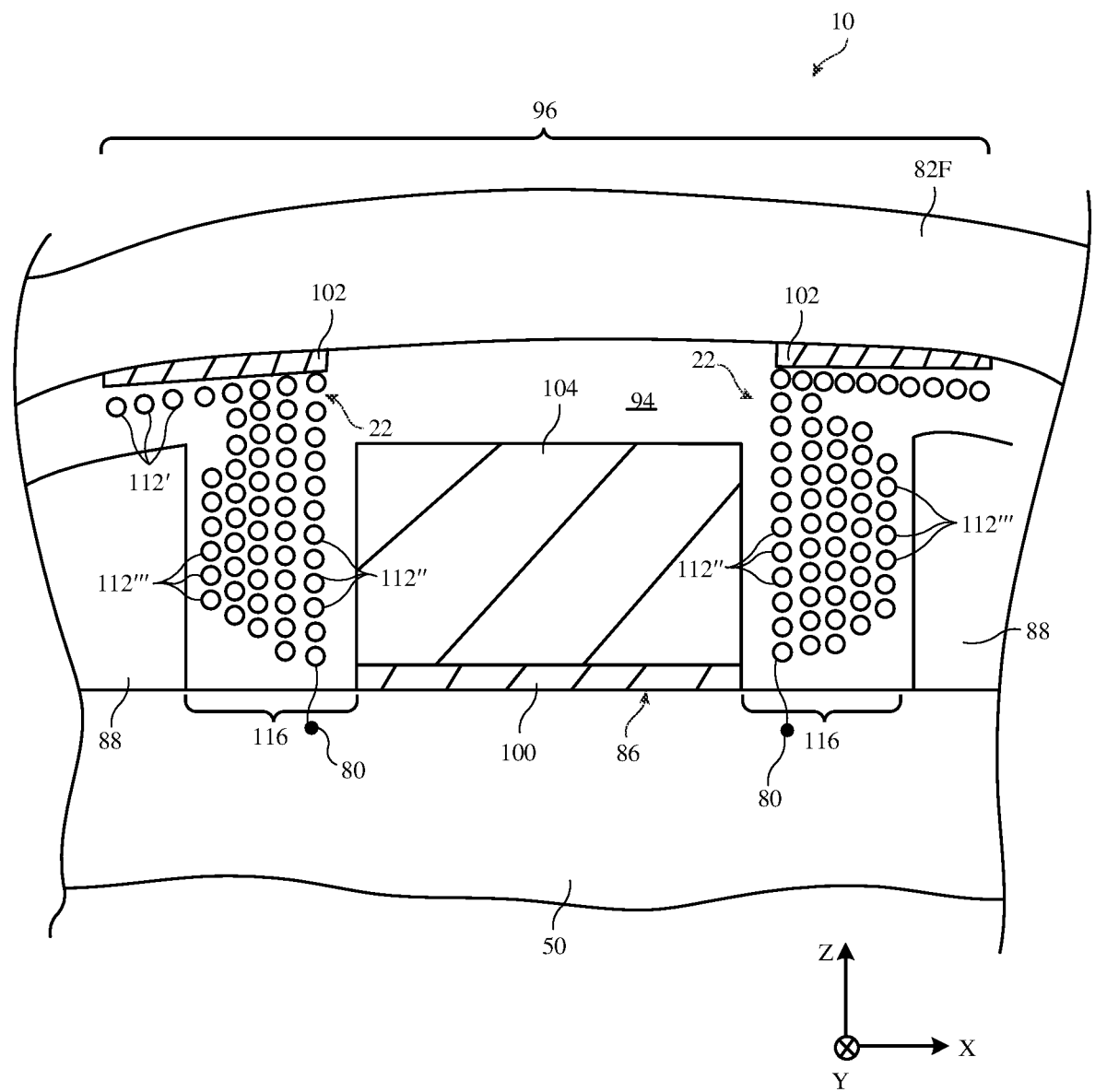
FIG. 7 is a cross-sectional side view of an illustrative coil that includes both flattened windings and multiple layers of vertically-stacked windings in accordance with some embodiments.

FIG. 7 is a cross-sectional side view showing how coil 22 may include flattened windings and multiple layers of vertically-stacked windings. As shown in FIG. 7, coil 22 may include vertically-stacked windings 112", flattened windings 112' attached to front wall 82F by adhesive 102, and additional layers of vertically-stacked windings 112' within cavity 116. Flattened windings 112' may, for example, support optimal near-field communications while vertically-stacked windings 112" and 112' support optimal wireless charging without excessive losses to audio and/or haptic performance. The example of FIG. 7 is merely illustrative. Coil 22 may have other shapes. Coil leads 80 may be coupled to any portions of coil 22.

Figure 8:
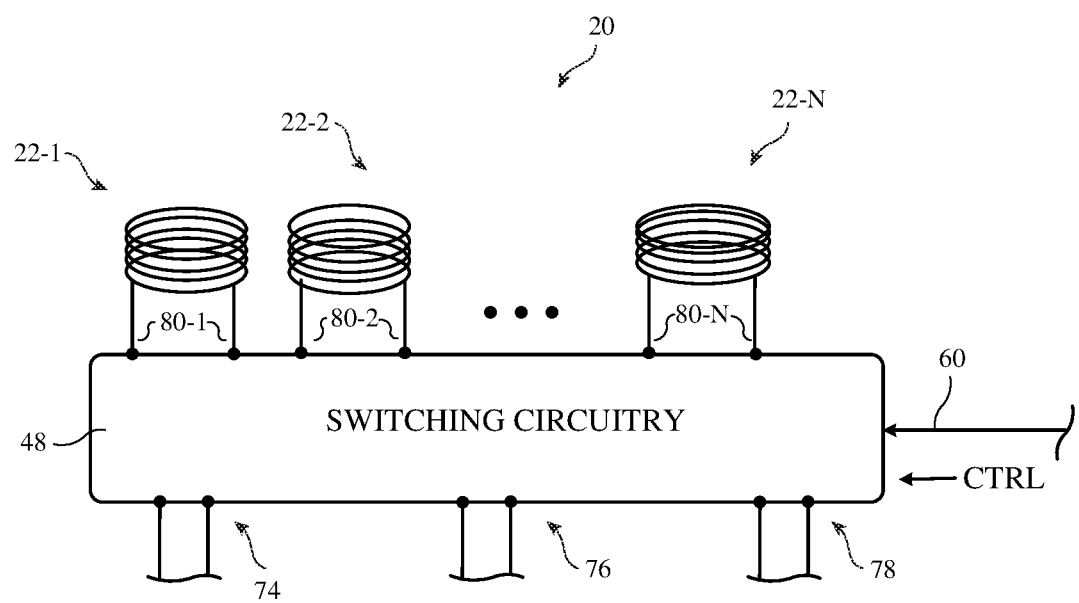
FIG. 8 is a schematic diagram showing how illustrative input-output circuitry may include multiple coils that are shared by any combination of acoustic and haptic amplifier circuitry, near-field communications circuitry, and wireless charging circuitry in accordance with some embodiments.

In the examples of FIGS. 2-7, only a single shared coil 22 is illustrated for the sake of simplicity. If desired, acoustic/haptic amplifier circuitry 68, NFC matching network 70, and wireless charging converter 72 of FIG. 2 may use multiple coils to transmit and/or receive information. FIG. 8 is a schematic diagram showing how multiple coils may be coupled to switching circuitry 48 of FIG. 2.

As shown in FIG. 8, switching circuitry 48 may be coupled to the coil leads of any desired number N of coils 22 (e.g., switching circuitry 48 may be coupled to coil leads 80-1 of coil 22-1, coil leads 80-2 of coil 22-2, coil leads 80-N of coil 22-N, etc.). Control signals CTRL may be received over control path 60 and may control switching circuitry 48 to selectively activate acoustic/haptic circuitry 30, wireless charging circuitry 32, and near-field communications circuitry 34 (FIG. 1) by coupling the corresponding ports 74, 76, and 78 to a given one of coils 22-1 through 22-N.

Each coil 22 may be used by only one of ports 74, 76, and 78 or one or more of the coils may be shared by two or more (e.g., all three) of ports 74, 76, and 78. In one suitable arrangement, there may be four coils, where the first coil receives haptic signals from port 74, the second coil receives audio signals from port 74 (or from an additional port in scenarios where separate haptic and audio amplifiers are used), the third coil conveys near-field communications signals for port 76, and the fourth coil receives wireless charging signals for port 78 (e.g., coils 22 need not be shared). In another suitable arrangement, there may be three coils, where the first coil receives haptic signals and audio signals from port 74 (or from two ports in scenarios where separate haptic and audio amplifiers are used), the second coil conveys near-field communications signals for port 76, and the fourth coil receives wireless charging signals for port 78 (e.g., one of coils 22 may be used to convey both audio signals and haptic signals whereas the other coils are unshared). In another suitable arrangement, there may be two coils, where the first coil receives haptic signals and audio signals from port 74 (or from two ports in scenarios where separate haptic and audio amplifiers are used) and the second coil conveys near-field communications signals for port 76 and wireless charging signals for port 78 (e.g., one of coils 22 may be shared by wireless charging circuitry 32 and near-field communications circuitry 34).

In another suitable arrangement, there may be two coils, where the first coil receives haptic signals and audio signals from port 74 (or from two ports in scenarios where separate haptic and audio amplifiers are used) and conveys near-field communications signals for port 76 whereas the second coil receives wireless charging signals for port 78 (e.g., one of coils 22 may be shared by acoustic/haptic circuitry 30 and near-field communications circuitry 34 whereas the other coil is only used by wireless charging circuitry 32). In yet another suitable arrangement, there may be two coils, where the first coil receives haptic signals and audio signals from port 74 (or from two ports in scenarios where separate haptic and audio amplifiers are used) and wireless charging signals for port 78 whereas the second coil conveys near-field communications signals for port 76 (e.g., one of coils 22 may be shared by acoustic/haptic circuitry 30 and wireless charging circuitry 32 whereas the other coil is only used by near-field communications circuitry 34). These examples are merely illustrative and, in general, any desired number of coils may be shared by any desired combination of acoustic/haptic circuitry 30, wireless charging circuitry 32, and near-field communications circuitry 34.

Figure 9:
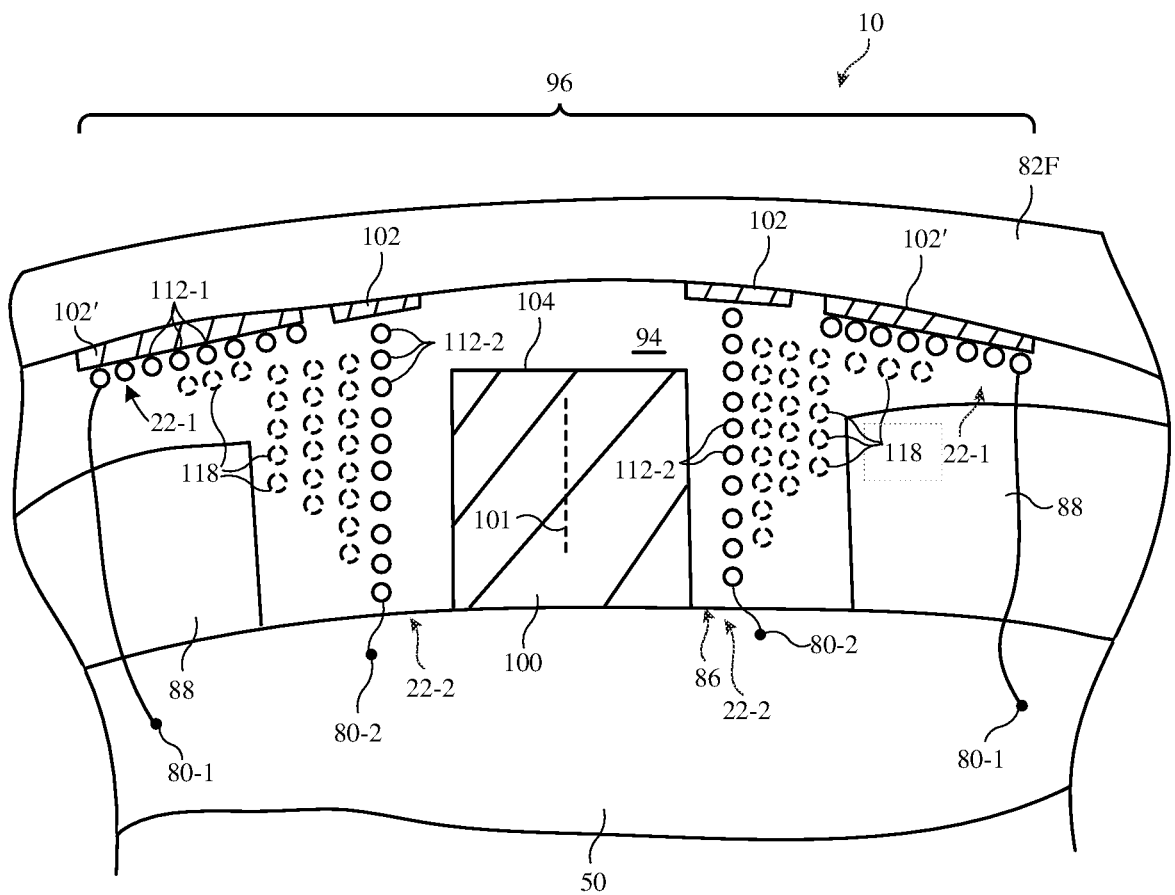
FIG. 9 is a cross-sectional side view showing how an illustrative electronic device may include both a first coil having vertically stacked windings and a second coil having flattened windings in accordance with some embodiments.

FIG. 9 is a cross-sectional side view of device 10 in one particular example where two coils are shared by acoustic/haptic circuitry 30, wireless charging circuitry 32, and near-field communications circuitry 34. As shown in FIG. 9, device 10 may include a first coil such as coil 22-1 and a second coil such as coil 22-2. Coil 22-1 may laterally surround coil 22-2 about central axis 101 and cavity 94 (e.g., coils 22-1 and 22-2 may be concentric about central axis 101). In the example of FIG. 9, coil 22-1 may include flattened windings 112-1 (e.g., flattened windings such as flattened windings 112' of FIGS. 4, 5, and 7) that are attached to front wall 82F by adhesive 102' whereas coil 22-2 includes vertically-stacked windings 112-2 that are attached to front wall 82F by adhesive 102. This is merely illustrative and, if desired, the same layer of adhesive may be used to attach both coils 22-1 and 22-2 to front wall 82F. Coil 22-1 may have coil leads 80-1 that are coupled to switching circuitry 48 of FIG. 8 whereas coil 22-2 has coil leads 80-2 that are coupled to switching circuitry 48 of FIG. 8. If desired, additional layers of vertically-stacked windings 118 (e.g., the additional layers of vertically-stacked windings 112''' of FIGS. 6 and 7) may be formed as a part of coil 22-1 and/or coil 22-2 (e.g., for further optimizing wireless charging efficiency for device 10).

If desired, coil 22-1 may only be used by near-field communications circuitry 34. For example, control circuitry 28 may activate near-field communications circuitry 34 by controlling switching circuitry 48 to couple port 76 to coil 22-1 (FIG. 8). Because coil 22-1 includes flattened windings 112-1, coil 22-1 may provide device 10 with optimal antenna efficiency for conveying near-field communications signals. On the other hand, coil 22-2 may be shared by acoustic/haptic circuitry 30 and wireless charging circuitry 32. For example, control circuitry 28 may activate acoustic/haptic circuitry 30 by controlling switching circuitry 48 to couple port 74 to coil 22-2 (FIG. 8). Audio signals and haptic signals driven onto coil 22-2 may cause coil 22-2 to move up and down, thereby moving front wall 82F and producing sound or a haptic vibration. Control circuitry 28 may activate wireless charging circuitry 32 (e.g., concurrently with activation of acoustic/haptic circuitry 30 or at a different time) by controlling switching circuitry 48 to couple port 78 to coil 22-2 (FIG. 8). Wireless power received by coil 22-2 may be used to charge battery 18 or to otherwise power device 10.

This example is merely illustrative. If desired, coil 22-1 may be shared by wireless charging circuitry 32 and near-field communications circuitry 34. Coil 22-1 may additionally or alternatively include vertically-stacked windings and/or coil 22-2 may additionally or alternatively include flattened windings. Coils 22-1 and 22-2 may have other shapes or arrangements. Three or more coils may be used if desired. If desired, one or more of coils 22 may also be used to convey radio-frequency signals 46 for other wireless communications circuitry 36 of FIG. 1 (e.g., coil 22 may be shared by circuitry 30, 32, 34, and/or 36 of FIG. 1).

In general, any desired combination of audio signals, haptic signals, near-field communications signals, and wireless charging signals may be concurrently or sequentially conveyed by one or more coils 22 (e.g., one or more coils may only convey one of these types of signals at any given time or may convey any combination of two, three, or all of these types of signals at any given time). Control circuitry 28 may control switching circuitry 48 (FIGS. 2 and 8) to control which of these signals are conveyed by the coils at any given time.

FIG. 10 shows an exemplary table 120 of different possible operating states for device 10. In each operating state, one, two, three, four, or none of the audio signals, haptic signals, near-field communications signals, and wireless charging signals are conveyed by the coils (e.g., a single coil as shown in FIGS. 2-7 or multiple shared and/or dedicated coils as shown in FIGS. 8 and 9). Each row of table 120 illustrates a corresponding operating state.

As shown in FIG. 10, where the "ACOUSTIC OUTPUT" column is listed as "ACTIVE" in table 120, acoustic/haptic circuitry 30 of FIG. 1 is coupled to a given coil and drives audio signals onto that coil. Where the "ACOUSTIC OUTPUT" column is listed as "INACTIVE" in table 120, acoustic/haptic circuitry 30 of FIG. 1 is de-coupled from that coil or is otherwise not actively driving audio signals onto the coil. Where the "HAPTIC OUTPUT" column is listed as "ACTIVE" in table 120, acoustic/haptic circuitry 30 of FIG. 1 is coupled to a given coil and drives haptic signals to that coil. Where the "HAPTIC OUTPUT" column is listed as "INACTIVE" in table 120, acoustic/haptic circuitry 30 of FIG. 1 is de-coupled from that coil or is otherwise not actively driving haptic signals onto the coil. Where the "NFC COMMS" column is listed as "ACTIVE" in table 120, near-field communications circuitry 34 of FIG. 1 is coupled to a given coil and is conveying near-field communications signals with that coil. Where the "NFC COMMS" column is listed as "INACTIVE" in table 120, near-field communications circuitry 34 of FIG. 1 is de-coupled from that coil or is otherwise not actively conveying near-field communications signals using the coil. Where the "WIRELESS CHARGING" column is listed as "ACTIVE" in table 120, wireless charging circuitry 32 of FIG. 1 is coupled to a given coil and is conveying wireless charging signals for charging battery 18. Where the "WIRELESS CHARGING" column is listed as "INACTIVE" in table 120, wireless charging circuitry 32 of FIG. 1 is de-coupled from that coil or is otherwise not actively receiving wireless charging signals using the coil.

Control circuitry 28 may place device 10 in one of these operating states by adjusting the state of switching circuitry 48. For example, when it is desired for device 10 to emit an audible sound (e.g., in response to a software trigger or receiving corresponding control signals via radio-frequency signals 46 of FIG. 1), control circuitry 28 may place device 10 in operating state "B," when it is desired for device 10 to emit a haptic vibration alert, control circuitry 28 may place device 10 in operating state "C," when it is desired for device 10 to emit both a haptic vibration alert and an audible sound, control circuitry 28 may place device 10 in operating state "F," when it is desired to convey near-field communications signals (e.g., in response to receiving near-field communications signals at device 10), control circuitry 28 may place device 10 in operating state "D," when it is desired to wirelessly charge battery 18 (e.g., in response to receiving wireless charging signals at device 10), control circuitry 28 may place device 10 in operating state "E," when it is desired to concurrently perform near-field communications and wireless charging, control circuitry 28 may place device 10 in operating state "H," etc. The example of FIG. 10 in which table 120 illustrates each possible combination of concurrent uses for the coils is merely illustrative. If desired, control circuitry 28 may only adjust device 10 between a subset of the states shown in table 120. For example, in scenarios where the coils do not need to concurrently convey any of the signals, control circuitry 28 may only adjust device 10 between operating states A-E, whereas operating states F-P are unused.

In the example of FIG. 10, device 10 conveys four types of information using the coils (e.g., audio signals, haptic signals, near-field communications signals, and wireless charging signals). This is merely illustrative and, if desired, device 10 may convey only a subset of these types of information. In one suitable arrangement, device 10 may convey only three of these types of information. FIG. 11 shows an exemplary table 122 of different possible operating states for device 10 in this scenario. In table 122 of FIG. 11, the "FIRST SOURCE," "SECOND SOURCE," and "THIRD SOURCE" may each be any of audio signals, haptic signals, near-field communications signals, and wireless charging signals that are to be conveyed by one or more coils. One of these sources may be other wireless communications circuitry 36 in scenarios where other wireless communications circuitry 36 also shares coil 22. Table 122 illustrates each of the nine possible operating states in which signals from these sources are conveyed individually or concurrently using the coils. If desired, control circuitry 28 may only adjust device 10 between a subset of the operating states shown in table 122.

In another suitable arrangement, device 10 may convey only two of the audio signals, haptic signals, near-field communications signals, and wireless charging signals. FIG. 12 shows an exemplary table 124 of different operating states for device 10 in this scenario. In table 124, the "FIRST SOURCE" and "SECOND SOURCE" may each be any of audio signals, haptic signals, near-field communications signals, and wireless charging signals that are to be conveyed by one or more coils. Table 124 illustrates each of the four possible operating states in which signals from these sources are conveyed individually or concurrently using the coils. If desired, control circuitry 28 may only adjust device 10 between a subset of the operating states shown in table 124.

Figure 13:
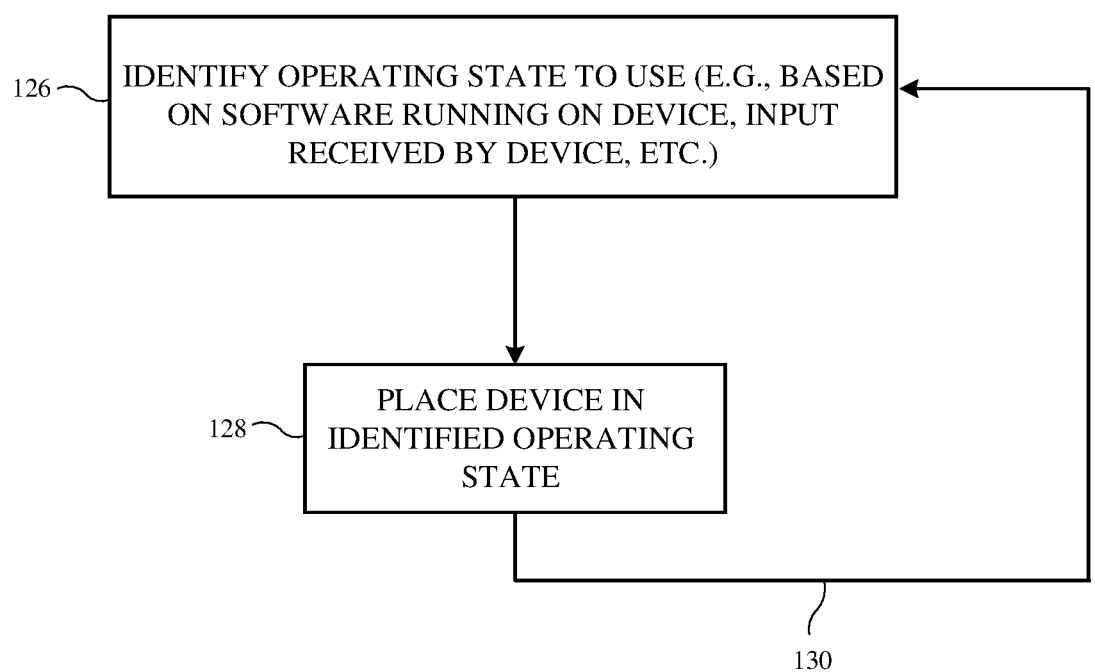
FIG. 13 is a flow chart of illustrative steps that may be performed by control circuitry to adjust an electronic device between operating states of the types shown in FIGS. 10-12 in accordance with some embodiments.

FIG. 13 is a flow chart of illustrative steps that may be performed by control circuitry 28 in adjusting the operating state of device 10. At step 126 of FIG. 13, control circuitry 28 may identify an operating state to be used. Control circuitry 28 may identify the operating state to be used based on software applications running on control circuitry 28, input received at device 10 (e.g., input provided to device 10 by a user via an input-output device, the reception of wireless charging signals 42, the reception of near-field communications signals 44, the reception of radio-frequency signals 46, etc.).

As an example, control circuitry 28 may place device 10 in operating state "B," "C," or "F," or any other operating state of FIGS. 10-12 where the acoustic and/or haptic output is active in response to receiving radio-frequency signals 46 from external communications equipment 16 (e.g., radio-frequency signals that control device 10 to help a user of external communications equipment 16 to locate device 10) or in response to any other trigger condition. Control circuitry 28 may place device 10 in operating state "D," "G," "H," or any other operating state of FIG. 10-12 where near-field communications circuitry 34 is active in response to receiving near-field communications signals 44 from external communications equipment 16 (e.g., when a user of external communications equipment 16 swipes external communications equipment 16 over device 10) or in response to any other trigger condition. In one suitable arrangement, wireless energy in received near-field communications signals 44 may cause switching circuitry 48 to change states to activate near-field communications circuitry 34. Control circuitry 28 may place device 10 in operating state "E," "H," "J," or any other operating state of FIG. 10-12 where wireless charging circuitry 32 is active in response to receiving wireless charging signals 42 from wireless charging equipment 14 (e.g., when a user of wireless charging equipment 14 places device 10 on wireless charging equipment 14) or in response to any other trigger condition. These examples are merely illustrative. Phase shifts may be applied between the signals provided to different coils to help isolate the coils from each other during concurrent operation if desired.

At step 128, control circuitry 28 may place device 10 in the identified operating state. For example, control circuitry 28 may control switching circuitry 48 of FIGS. 2 and 8 to place device 10 in the identified operating state. If desired, control circuitry 28 may disable (e.g., power off) acoustic/haptic circuitry 30, wireless charging circuitry 32, and/or near-field communications circuitry 34 while not in use to conserve power. Processing may loop back to step 126, as shown by path 130, so that control circuitry 28 may continue to update the operating state of device 10 as needed over time.

The foregoing is merely illustrative and various modifications can be made to the described embodiments. The foregoing embodiments may be implemented individually or in any combination.

What is claimed is:

1. An electronic device comprising:
   a housing;
   a battery in the housing;
   a conductive coil in the housing;
   amplifier circuitry coupled to the conductive coil and configured to drive audio signals onto the conductive coil;
   near-field communications circuitry coupled to the conductive coil and configured to convey near-field communications signals using the conductive coil;
   wireless charging circuitry coupled to the conductive coil, wherein the wireless charging circuitry is configured to receive wireless power using the conductive coil and to charge the battery using the received wireless power;
   switching circuitry having a first port coupled to the conductive coil, a second port coupled to the amplifier circuitry, a third port coupled to the near-field communications circuitry, and a fourth port coupled to the wireless charging circuitry; and
   control circuitry configured to control the switching circuitry to selectively couple the second, third, and fourth ports to the first port.

2. The electronic device defined in claim 1, wherein the control circuitry is configured to control the switching circuitry to concurrently couple two of the second, third, and fourth ports to the first port.

3. The electronic device defined in claim 1, wherein the control circuitry is configured to control the switching circuitry to concurrently couple each of the second, third, and fourth ports to the first port.

4. The electronic device defined in claim 1, further comprising:
   an antenna that is separate from the conductive coil; and
   radio-frequency transceiver circuitry coupled to the antenna, wherein the radio-frequency transceiver circuitry is configured to receive radio-frequency signals at a frequency greater than 600 MHz using the antenna.

5. The electronic device defined in claim 4, wherein the control circuitry is configured to control, responsive to receiving the radio-frequency signals using the antenna, the switching circuitry to couple the first port to the second port and the amplifier circuitry to drive the audio signals onto the conductive coil through the switching circuitry.

6. The electronic device defined in claim 4, wherein the radio-frequency transceiver circuitry comprises an ultra-wideband communications transceiver and wherein the frequency is greater than 5 GHz.

7. The electronic device defined in claim 1, wherein the housing has a front wall, a rear wall, and a sidewall extending from the rear wall to the front wall, the electronic device further comprising:
   a layer of adhesive that adheres the conductive coil to the front wall.

8. The electronic device defined in claim 7, further comprising:
   a magnet, wherein the conductive coil is coiled around the magnet, wherein, when the amplifier circuitry drives the audio signals onto the conductive coil, the conductive coil is configured to form a voice coil and the front wall is configured to form a speaker diaphragm for the voice coil, and wherein the speaker diaphragm is configured to vibrate to emit an audible sound responsive to the audio signals being driven onto the conductive coil.

9. The electronic device defined in claim 8, wherein the amplifier circuitry is configured to drive haptic signals onto the conductive coil and wherein, when the amplifier circuitry drives the haptic signals onto the conductive coil, the conductive coil is configured to vibrate the front wall to produce a vibration alert.

10. The electronic device defined in claim 7, wherein the conductive coil comprises flattened windings and vertically-stacked windings, the flattened windings being coupled to the front wall by the layer of adhesive.

11. An electronic device comprising:
    a housing having a housing wall;
    a magnet in the housing;
    a conductive coil in the housing and coiled around the magnet;

a layer of adhesive that attaches the conductive coil to the housing wall; and amplifier circuitry coupled to the conductive coil, wherein the amplifier circuitry is configured to drive audio signals onto the conductive coil and wherein, when the conductive coil is driven by the audio signals, the conductive coil is configured to vibrate the housing wall to produce an audible sound.

12. The electronic device defined in claim 11, wherein the conductive coil comprises a first set of windings that lie within a surface extending along the housing wall, wherein the layer of adhesive attaches the first set of windings to the housing wall, and wherein the electronic device further comprises:

near-field communications circuitry coupled to the conductive coil and configured to convey near-field communications signals through the housing wall using the conductive coil.

13. The electronic device defined in claim 12, wherein the conductive coil further comprises a second set of windings that are vertically-stacked and that extend from the first set of windings and away from the housing wall.

14. The electronic device defined in claim 13, further comprising:

a logic board, wherein the amplifier circuitry is mounted to the logic board;

device components on the logic board, wherein the device components are separated from the second set of windings by a cavity and wherein the conductive coil further comprises a third set of windings that fill the cavity;

a battery mounted to the logic board; and wireless charging circuitry mounted to the logic board and coupled to the conductive coil, wherein the wireless charging circuitry is configured to receive wireless charging signals through the conductive wall using the conductive coil and wherein the wireless charging circuitry is configured to charge the battery using the wireless charging signals.

15. The electronic device defined in claim 11, wherein the conductive coil comprises a first and second sets of windings, wherein the adhesive layer attaches the first set of windings to the housing wall and wherein the first set of windings are vertically-stacked and extend away from the housing wall, the electronic device further comprising:

a logic board, wherein the amplifier circuitry is mounted to the logic board;

device components on the logic board, wherein the device components are separated from the first set of windings by a cavity and wherein the second set of windings are vertically-stacked and located within the cavity;

a battery mounted to the logic board; and wireless charging circuitry mounted to the logic board and coupled to the conductive coil, wherein the wireless charging circuitry is configured to receive wireless charging signals through the conductive wall using the conductive coil and wherein the wireless charging circuitry is configured to charge the battery using the wireless charging signals.

16. The electronic device defined in claim 11, wherein the amplifier circuitry is configured to drive haptic signals onto the conductive coil and wherein, when the conductive coil is driven by the haptic signals, the conductive coil is configured to vibrate the housing wall to produce a haptic vibration.

17. The electronic device defined in claim 16, wherein the coil surrounds an opening, wherein the housing wall has a first portion that overlaps the opening and a second portion that surrounds the first portion, wherein the first portion of the housing wall has a first density, and wherein the second portion of the housing wall has a second density that is less than the first density.

18. The electronic device defined in claim 16, wherein the coil surrounds an opening, wherein the housing wall has a first portion that overlaps the opening and a second portion that surrounds the first portion, wherein the electronic device further comprises a layer of material that is attached to the first portion of the housing wall and that does not overlap the second portion of the housing wall, and wherein, when the conductive coil is driven by the haptic signals, the first portion of the housing wall and the additional layer of material are configured to vibrate to produce the haptic vibration.

19. An electronic device comprising:

a housing having a housing wall;

a magnet in the housing;

a first conductive coil adhered to the housing wall, wherein the first conductive coil is coiled around the magnet and extends away from the housing wall;

a second conductive coil adhered to the housing wall, wherein the second conductive coil is coiled around the first conductive coil and lies within a surface that extends along the housing wall;

amplifier circuitry coupled to the first conductive coil and configured to drive signals onto the first conductive coil, the first conductive coil being configured to vibrate the housing wall when driven by the signals; and near-field communications circuitry coupled to the second conductive coil and configured to convey near-field communications signals through the housing wall using the second conductive coil.

* * * * *